Feb. 3, 1959 — C. E. BRANICK — 2,871,518
CURING AND TESTING RIM FOR PNEUMATIC TIRE CASINGS
Filed Nov. 26, 1957
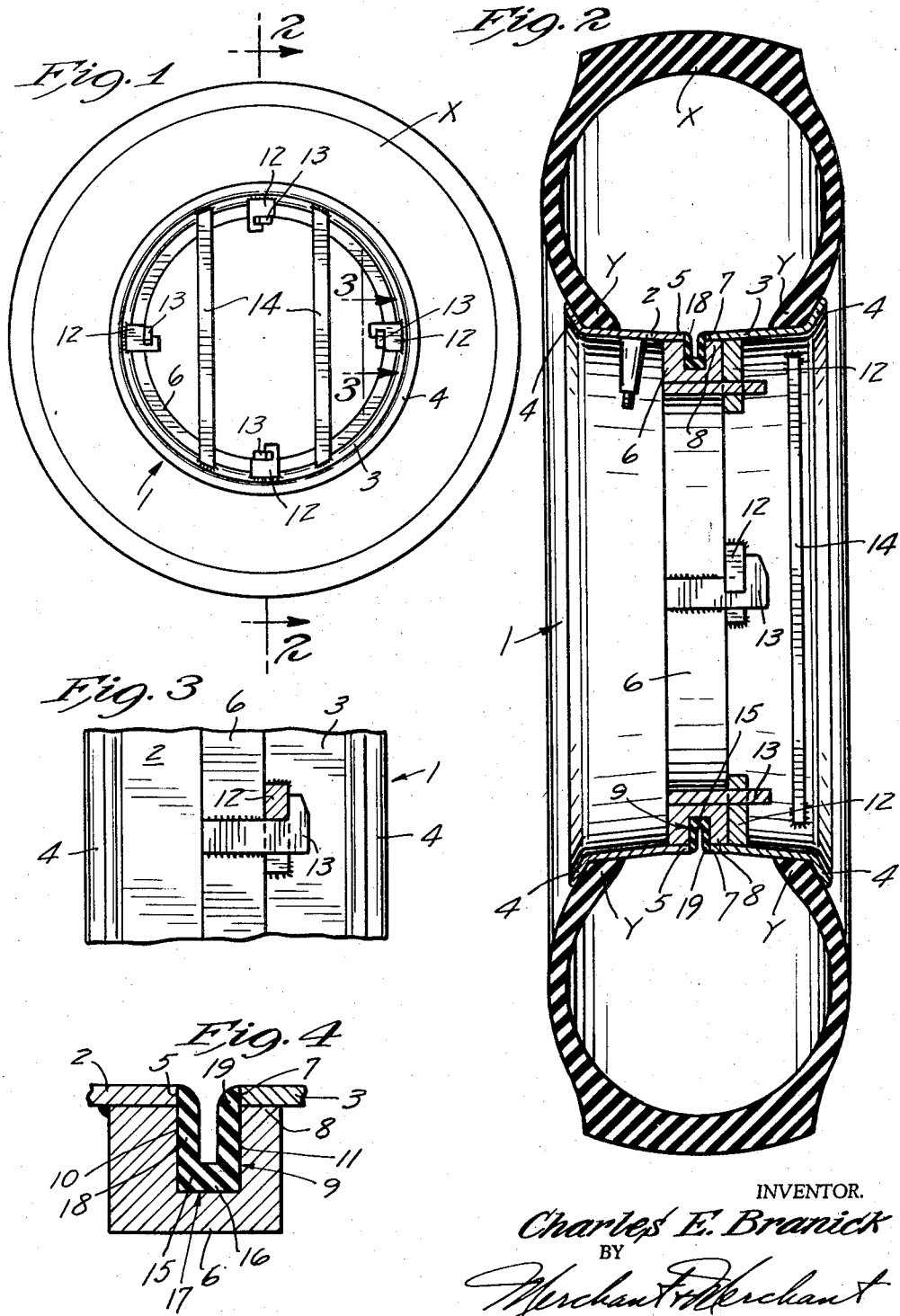
INVENTOR.
Charles E. Branick
BY
Merchant & Merchant
ATTORNEYS

United States Patent Office 2,871,518
Patented Feb. 3, 1959

2,871,518
CURING AND TESTING RIM FOR PNEUMATIC TIRE CASINGS

Charles E. Branick, Fargo, N. Dak.

Application November 26, 1957, Serial No. 699,010

2 Claims. (Cl. 18—45)

My invention relates to rims for pneumatic tire casings and more particularly to curing and testing rims for pneumatic tire casings of the tubeless type.

In most tire retreading operations, in order to bring about proper pressure between the casing and the curing mold or matrix, internal expanding pressure within the casing it utilized. This pressure is brought about through the medium of an innertube or curing bag within the casing, and a rim, known as a curing rim. My invention relates to the type of curing rim comprising a pair of cooperating annular sections which are quickly locked together and detached through the medium of hooks carried by one section and engageable with locking lugs on the other thereof when one of the rim sections is rotated with respect to the other thereof when said sections are aligned. Heretofore, no effective means has been found to effect a pressure seal between the cooperating rim sections. Therefore, it has been necessary to use air bags in curing of new treads or worn casings, even after the advent of the tubeless tire.

The primary object of my invention is the provision of a novel curing rim of the type above described which is provided with means for efficiently effecting a pressure seal between the sections when air pressure is introduced into a tubeless tire casing mounted on said sections, whereby the necessity of using air bags is eliminated, with a consequent saving of time and considerable expense.

It is extremely important in the mounting and dismounting of rim sections of the type above described, on a pneumatic tire casing, that there be a minimum of frictional engagement between the sections so that one section may be freely rotated with respect to the other for the purpose of locking and unlocking same.

In line with this, a further object of my invention is the provision of a novel pressure seal between the rim sections which frictionally engages the said sections only when internal expanding pressure is applied to the tire mounting rim sections.

A further object of my invention is the provision of a device of the class above described which may be similarly used in pressure testing of tubeless pneumatic tire casings to determine presence or absence of leaks in the side walls thereof, as well as in spot vulcanizing and the like wherein internal pressure is required.

A still further object of my invention is the provision of a device of the class described which is simple, quick and positive in its operation.

A further object of my invention is the provision of a device of the class above described which is relatively inexpensive to produce, which is rugged in construction and durable.

The above and still further objects of my invention will become apparent from the following detailed specification, appended claims and attached drawings.

Referring to the drawings wherein like characters indicate like parts throughout the several views:

Fig. 1 is a view in side elevation of my novel rim mounted upon a pneumatic tire casing;

Fig. 2 is an enlarged sectional view taken on the line 2—2 of Fig. 1;

Fig. 3 is an enlarged fragmentary sectional view taken on the line 3—3 of Fig. 1; and Fig. 4 is an enlarged fragmentary view in perspective of the seal between the sections of my novel curing rim.

Referring with greater particularity to the drawings, the numeral 1 indicates in its entirety my novel rim comprising a pair of generally cylindrical felly-band forming sections 2 and 3, each thereof having a generally radially outwardly projecting circumferentially extended tire bead engaging flange 4 at its outer edge. The rim section 2 is formed adjacent its inner edge 5 with a radially inwardly projecting endless unbroken rib 6 which underlies the adjacent edge 7 of the rim section 3 and acts as a centering means therefor, as indicated at 8, when the rim sections 2, 3 are axially aligned.

As shown in Figs. 2 and 4, the endless rib 6 is formed to provide a radially outwardly opening endless circumferential channel 9, the side wall 10 of which is in alignment with the inner edge 5 of the rim section 2 and the side wall 11 of which is in alignment with the inner edge 7 of the rim section 3 when the rib 6 is in engagement with the circumferentially spaced radially inwardly projecting locking lugs 12 carried by the rim section 3. Adapted to cooperate with the lugs 12 are a plurality of circumferentially spaced hook elements 13 carried by the rib 6 and extending axially toward the rim section 3 and the locking lugs 12 carried thereby. In practice, one of the rim sections 2, 3 is placed upon a suitable horizontal supporting means and the pneumatic tire casing X is dropped thereover with the bead portion Y engaging the rim flange 4 thereof. Thereafter, the other rim section is dropped though the opening in the tire casing X until the rim flange 4 thereof engages the opposite bead Y. When the locking lugs 12 are caused to engage the rib 6, limited rotary movement of the overlying rim section 2, 3 causes interlocking relationship between the hook elements 13 and the locking lugs 12. Hand grips 14 carried by one of the rim sections 2, 3 (shown as being carried by the lighter rim section 3) are provided for the purpose of facilitating rotary locking and unlocking movements of said rim section with respect to the other rim section 2.

Shown as snugly seated within the channel 9 is a cross-sectionally U-shaped elastic sealer element 15. Preferably and as shown, the sealer element 15 is formed from natural or synthetic rubber and has a bottom portion 16 in engagement with the bottom 17 of the channel 9, a radially outwardly projecting side portion 18 in engagement with the side wall 10 of the channel 9 as well as the aligned inner edge 5 of the rim section 2; and a side portion 19 which snugly engages the side wall 11 of the channel 9 and the inner edge 7 of the rim section 3. However, the engagement of the side portion 19 of the sealer element 15 with the inner edge 7 of the rim section 3 is not such as to noticeably effect rotation of the rim section 2 with respect to the rim section 3, for the purpose of causing locking and unlocking engagement between the hook elements 13 and their cooperating locking lugs 12, when there is no fluid under pressure within the casing X. However, the minute fluid under pressure is introduced into the casing X, the self-sealing bead portions Y thereof create a fluid tight seal with their cooperating rim flanges 4, all in a well known manner, and simultaneously the U-shaped sealer element 15 is caused to tightly impinge upon all surfaces into which it is in engagement and consequently seal off any air which might possibly escape between the centering portion 8 of the rib 6 and the inner edge 7 of the rim section 3. In fact, the greater the pressure within the casing X, the greater the sealing force exerted by the sealer element 15.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What I claim is:

1. A curing and pressure testing rim for tubeless tires comprising a pair of generally cylindrical felly-band forming sections having bead engaging flanges at their axially outer edges, means for detachably locking said sections together with their axially inner edges in spaced aligned relationship, one of said rim sections having a radially inwardly projecting unbroken rib adjacent its axially inner edge which underlies the adjacent edge of the other of said rim sections and acts as a centering means therefor, said rib defining a radially outwardly opening channel substantially the width of the space between the aligned edges of said sections, and a cross-sectionally U-shaped elastic sealer element snugly seated within said channel and having opposite side portions which snugly engage opposite sides of the channel and opposite edge portions of said rim sections, the maximum diameter of said U-shaped sealer element being not greater than the external diameter of the adjacent fellyband-forming rim sections, whereby to permit passage of the bead portion of a tire casing thereover during mounting and dismounting of said rim sections, air pressure within a pneumatic tire mounted on said rim sections causing sealing engagement of said sealing member between said sections.

2. The structure defined in claim 1 in which said means comprises circumferentially spaced hook elements carried by said rib and extending axially toward the other of said sections, and radially inwardly projecting hook receiving lugs on said other of said sections, said lugs abutting said rib to limit axial movements of said sections toward each other.

References Cited in the file of this patent

UNITED STATES PATENTS

| 1,205,161 | Chaney | Nov. 21, 1916 |
| 1,441,424 | Howell | Jan. 9, 1923 |
| 2,697,252 | Clark | Dec. 21, 1954 |
| 2,777,163 | Hawkinson | Jan. 15, 1957 |

FOREIGN PATENTS

| 267,567 | Great Britain | Mar. 14, 1927 |